Figure 1:
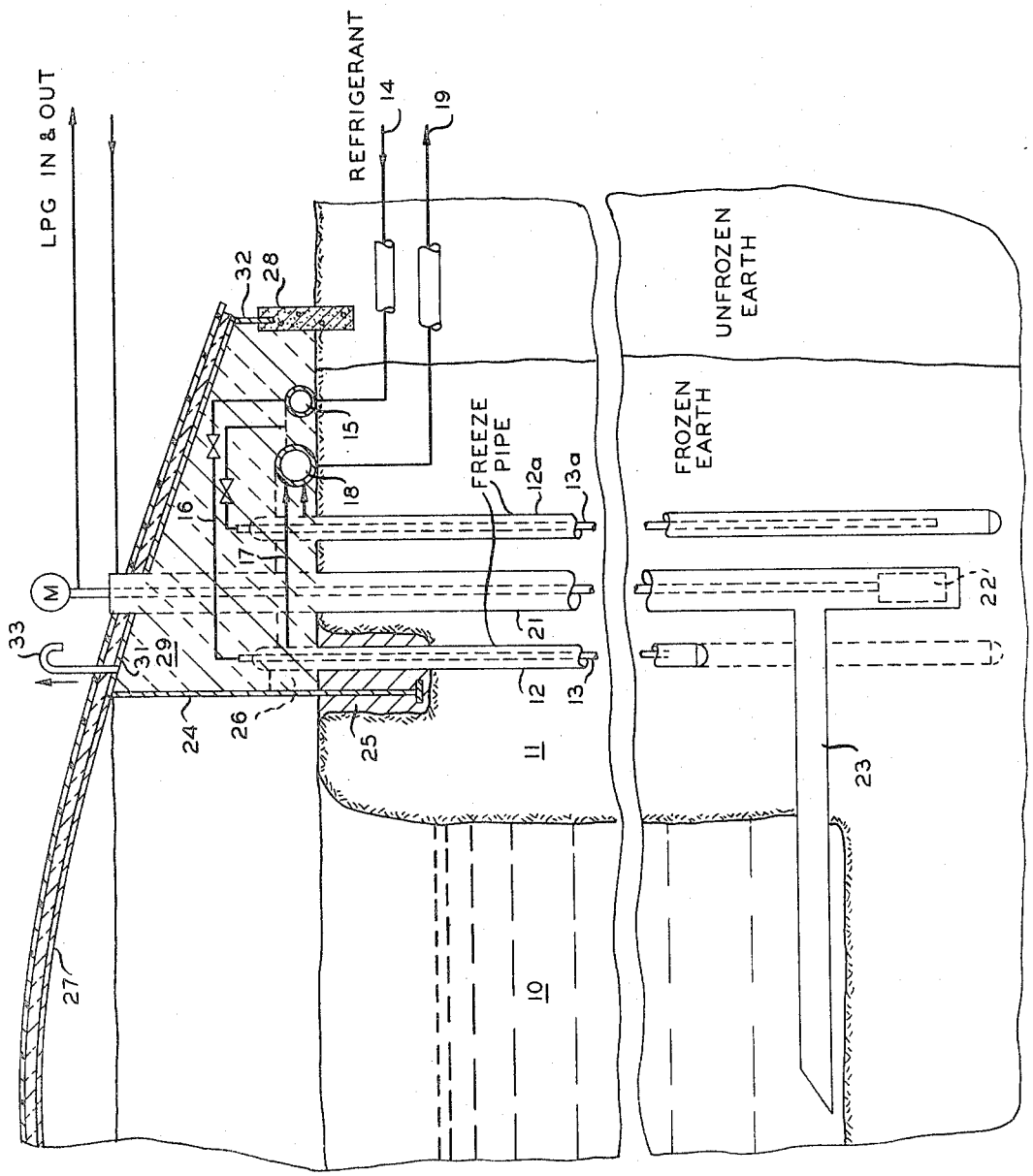

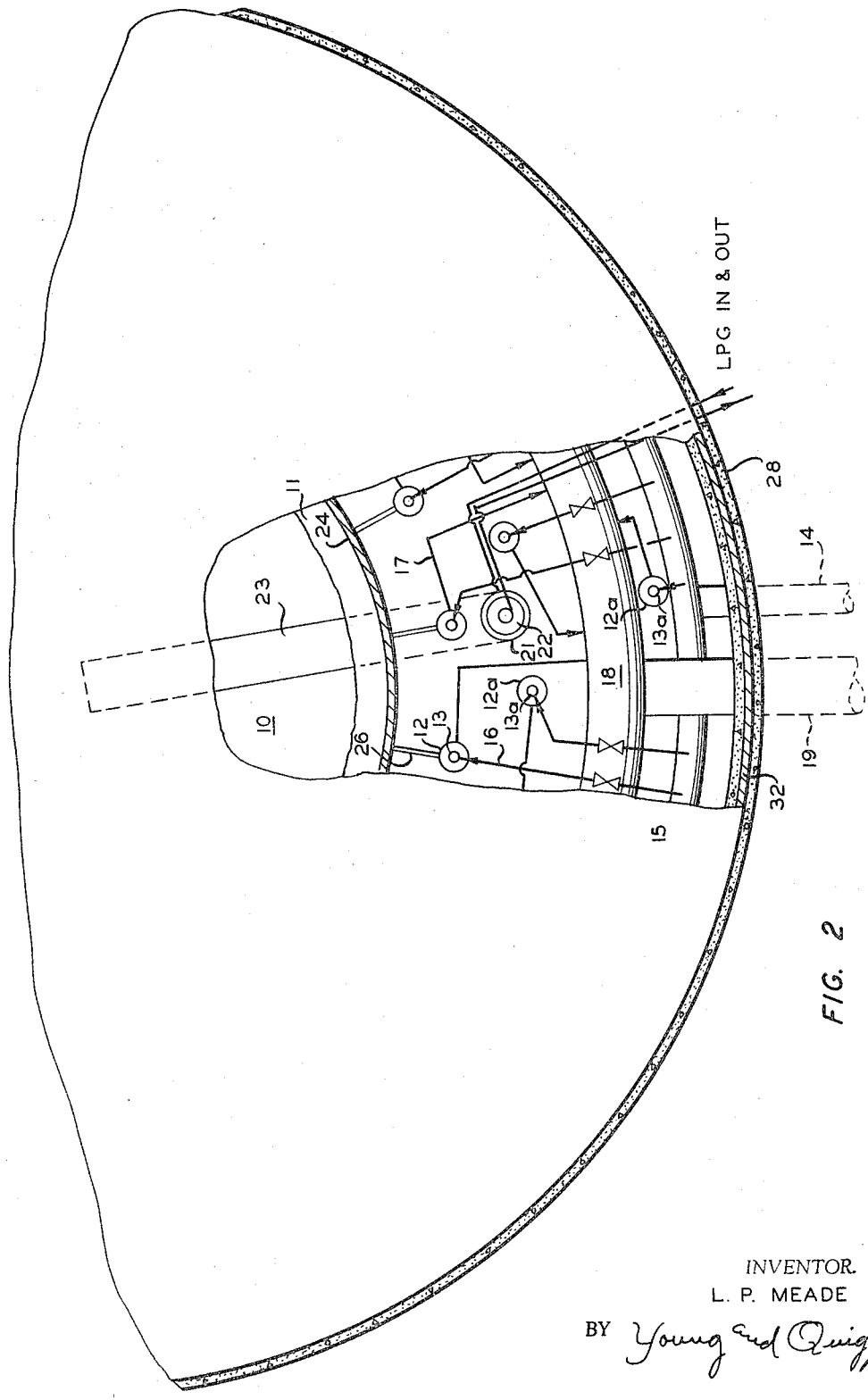

United States Patent Office 3,300,982
Patented Jan. 31, 1967

3,300,982
STORAGE OF VOLATILE LIQUIDS
Leonard P. Meade, Bartlesville, Okla., assignor to Phillips Petroleum Company, a corporation of Delaware
Filed Aug. 19, 1963, Ser. No. 302,831
3 Claims. (Cl. 61—.5)

This invention relates to the storage of volatile liquids. In one aspect it relates to a method for preparing a reservoir in the surface of the earth for the storage of volatile liquids. In another aspect it relates to an open-topped earthen reservoir in frozen earth having a vapor-impermeable cover thereover.

The petroleum industry produces great quantities of volatile liquid hydrocarbons as a result of processing crude oil and natural gas. Volatile liquids such as propane and butane require enormous storage facilities during periods of slack use. Increased seasonal demand for such products places an increased strain on these facilities. Great quantities of volatile liquids including propane and butane have been stored in underground caverns mined or dissolved from impervious formations. Such reservoirs, however, are limited to certain formations which are not always available at the desired location; are expensive to prepare; and present a serious problem of providing adequate vapor seals. More recently it has been proposed to fill an open-topped earthen reservoir with water, refrigerate the reservoir so as to freeze an ice cap on the water, pump out the water and fill the reservoir with a volatile liquid. Such reservoir is disclosed and claimed in Patent No. 2,961,840, issued Nov. 29, 1960, to W. A. Goldtrap. Still more recently it has been proposed to form an open-topped earthen reservoir in frozen earth and to cover the reservoir with a vapor-impermeable roof which is supported by and sealed to the frozen earth around the periphery of the reservoir.

The principal problem encountered in a frozen earth storage system is that of providing and maintaining an adequate vapor seal between the earthen reservoir and the cover or roof for the reservoir. Movement of the earthen formations as a result of the extreme temperature differences involved in a frozen earth storage and manifested by heaving of the formation adjacent the reservoir aggravates the problem of effecting and maintaining a vapor-tight cover over an open-topped frozen earth storage reservoir.

According to the present invention, a secondary seal, together with means for venting and controlling any vapor leaking past the primary seal, of a frozen ⁁rth reservoir is provided by installation of a curtain wall or curb in the earth's surface around the periphery of the reservoir beyond the area of frozen earth and sealing the space between the curtain wall and the wall which supports the roof of the reservoir with a vapor-tight cover containing therein a vent open to the atmosphere. The space beneath this cover is filled with dry, loose insulation such as expanded mica, vermiculite, glass wool, mineral wool, and the like.

The curb or curtain wall is sunk several feet into the earth's surface, preferably to the normal water table level so as to provide a substantially vapor-impermeable seal. It is desirable to imbed a metal plate vertically into the top of the wall to provide means for effecting a vapor-impermeable seal between the curb and the cover for the space between the curb and the shell of the reservoir enclosure. The insulation and metal cover provide protection for the refrigeration system piping above the surface of the ground around the periphery of the reservoir. The vent provides a convenient and reliable means for detecting leakage of vapor passing the primary seal which primary seal is the roof supporting shell enclosing the reservoir. The vent means further provides a means for collecting and disposing of vapors leaking past the primary seal by passing the vapors to a fuel system or to the refrigeration system compressor for return to the reservoir.

It is an object of this invention to provide a secondary seal and means for collecting and venting any vapors which leak past the primary seal of a frozen earth storage reservoir. It is also an object of the invention to collect and vent vapors which leak from the refrigeration system piping around the periphery of a frozen earth reservoir. Still another object of the invention is to provide mechanical protection for the refrigeration system piping on the surface of the frozen earth around the periphery of a frozen earth reservoir. The provision of a method for collecting and disposing of vapors occasioned by leakage from a frozen earth reservoir is still another object of my invention. Other objects and advantages of the invention will be apparent to one skilled in the art upon study of the disclosure of the invention including the detailed description of the invention and the appended drawing wherein:

FIGURE 1 is a view, in cross section, of a portion of the wall and roof of an earthen reservoir having embodied therein the present invention; and FIGURE 2 is a plan view of a segment of the reservoir of FIGURE 1 with a portion of the roof removed.

In FIGURE 1 a reservoir 10 is excavated in frozen earth 11. The earth 11 is frozen by means of a plurality of freeze pipes 12 sunk into the ground around the site of the reservoir 10. Each freeze pipe comprises a conduit 12 containing a refrigerant inlet pipe 13. A refrigerant is supplied to the inlet pipe 13 via conduit 14, manifold 15 and conduit 16 from a refrigeration system (not shown). The refrigeration system can be a conventional compressor and condenser combination. Several rows or banks of freeze pipes can be utilized as desired as indicated at 12 and 12a. Refrigerant vapors are removed from conduit 12 via conduit 17, manifold 18 and conduit 19 and returned to the refrigeration system. The manifolds and piping leading to and from the freeze pipes are suitably insulated.

A pump jacket conduit 21 can also be sunk into the earth to accommodate a submerged pump 22 for removing liquid from reservoir 10. A pump suction conduit 23 connects the pump jacket 21 to the reservoir 10. The pump jacket 10 can serve as an additional freeze pipe during the initial freezing operation. The pump jacket 10 can also serve as a fill line for adding liquid to the reservoir 10 since the pump 22 is below the level of the pump suction conduit 23.

A vapor impermeable wall 24 is sealed to the frozen earth by being frozen, for example, into a body of mud or ice 25. The wall 24 can also be secured to the freeze pipes 12 by means of gussets 26 welded to the wall 24 and freeze pipes 12. A vapor-impermeable roof 27 is secured to the top of wall 24 as by welding so as to provide a vapor-impermeable cover for reservoir 10.

A concrete curb or curtain wall 28 is sunk into the earth around the periphery of the reservoir site beyond the frozen earth area. The space between the wall 24 and curb 28 is filled with a loose insulation material such as expanded mica indicated at 29. A vapor-impermeable cover plate 31 is secured to the roof 27 and curb 28 and sealed, for example by welding at the roof edge and by welding at the curtain edge to a plate 32 imbedded in the concrete curb 28. The sealed space beneath the cover 31 is vented to the atmosphere by vent means 33. The vent provides a means for discovery of a leak in the primary seal. If the flow of vapor through vent 33 is of sufficient magnitude, the flow can be directed to the compressor for return to the reservoir.

The vapor pressure over the liquid in the reservoir can be maintained at a level such that the roof is at least partly supported by the compressed vapor over the body of liquid. The vapor pressure can be maintained at any desired level by removing vapor at a controlled rate for compression, cooling and returning to the reservoir.

The invention will now be described as applied to a circular earthen reservoir 95 feet in diameter and 95 feet in depth. A first 111-foot diameter circle and a second 117-foot diameter circle of freeze pipes are sunk about 150 feet into the ground around the periphery of the reservoir site. Liquid refrigerant (propane) is supplied to the lower end of the freeze pipes via the inlet pipe. The freeze pipe casings 12 and 12a are 4-inch diameter conduit and the liquid refrigerant inlet pipes 13 and 13a are 1-inch diameter conduits. A 10-inch diameter conduit is sunk between the rows of freeze pipes to serve as the discharge pump jacket and also as a fill line.

A ring wall 6 feet in height of ¼-inch thick tank steel plate is sunk 4 feet into the ground on the inside of the circle of freeze pipes so as to be frozen into the ground to provide the primary seal. The earth around the periphery of the reservoir site is saturated with water before the freezing operation is begun. A concrete curb is installed in a trench around the periphery of the reservoir site beyond the area of the earth's surface to be frozen. The trench for the concrete curb is about 4 feet deep. A metal strip of ¼-inch thick tank steel plate is imbedded in the top of the concrete curb at the time the concrete is poured. The space between the concrete curb and the ring wall is filled with dry, expanded mica and the metal cover containing the vent is secured in place before the freezing operation is begun. Excavation of the reservoir is begun about 9 weeks after the freezing operation is started. The exposed frozen wall of the reservoir is insulated as excavation progresses.

The roof is then fabricated and welded to the top of the ring wall. The roof is dome-shaped and is supported by a plurality of trusses which radiate from the center and rest on the ring wall. The truss structure is assembled on the ground adjacent the reservoir and is then placed in position by two cranes. The steel plate covering is welded in place to provide a vapor tight cover. The roof is then insulated with glass wool bats and covered with a weather-proof polyethylene film sheet. The insulation is continued around the periphery of the roof past the area of frozen earth.

The metal used in the above storage system for low temperature service, e.g., the freeze pipes, roof and ring wall, is weldable steel having superior low temperature impact properties. Steel for such service is commercially available.

The above reservoir is for the storage of liquid propane at substantially atmospheric pressure. Other volatile liquids such as liquefied natural gas; liquefied methane, ethane or butane; liquid ammonia; and the like, can be stored in the above reservoir by choosing the proper refrigerant.

That which is claimed is:

1. An earthen storage system for normally gaseous liquid comprising an open-topped earthen reservoir in frozen earth; freeze pipes vertically positioned in the earth around the periphery of said reservoir to maintain the walls of the reservoir frozen; a first vertical, enclosing, vapor-impermeable wall frozen to the earth around the periphery of the reservoir between the reservoir and freeze pipes; an insulated roof covering said reservoir supported by and sealed to said first wall; a second vertical, vapor-impermeable wall sealed to the unfrozen earth around said first wall and spaced from said first wall so as to enclose said freeze pipes; a vapor-impermeable cover sealed to said second wall and said roof so as to enclose said freeze pipes in a vapor-tight space; and a vent communicating between the atmosphere and the space beneath the cover and between said first and second walls.

2. The storage system of claim 1 wherein the space beneath the cover and between said first and second walls is substantially filled with insulation.

3. In an earthen storage system for normally gaseous liquid comprising an open-topped earthen reservoir in frozen earth having a plurality of freeze pipes vertically positioned in the earth around the periphery of the reservoir to maintain the earthen walls of the reservoir frozen, a first enclosing vertical, vapor-impermeable wall sealed to the frozen earth around the periphery of the reservoir and an insulated roof sealed to and supported by said first wall, the combination with said first wall of a second vertical, vapor-impermeable wall sealed to the unfrozen earth around said first wall so as to enclose the freeze pipes between said walls; and a vapor-impermeable cover sealed to said roof so as to enclose the area beneath said cover and between the walls in a vapor-tight space; and a vent in said cover communicating between the atmosphere and the space beneath the cover and between said first and second walls to equalize the pressure beneath said cover with that of the atmosphere.

References Cited by the Examiner

UNITED STATES PATENTS

| 2,961,840 | 11/1940 | Goldtrap | 61—.5 X |
| 3,175,370 | 3/1965 | Schlumberger et al. | 61—.5 X |
| 3,195,310 | 7/1965 | Schroeder | 61—.5 |

FOREIGN PATENTS

| 111,569 | 3/1962 | Pakistan. |

EARL J. WITMER, *Primary Examiner.*